United States Patent [19]

Mouser et al.

[11] Patent Number: 4,503,658
[45] Date of Patent: Mar. 12, 1985

[54] FEEDBACK CONTROLLED STRETCH WRAPPING APPARATUS AND PROCESS

[75] Inventors: Curtis A. Mouser, Louisville; Mark G. Roberts, Middletown; Daniel R. Haas, Louisville; Patrick R. Lancaster, III, Anchorage, all of Ky.

[73] Assignee: Lantech, Inc., Louisville, Ky.

[21] Appl. No.: 479,360

[22] Filed: Mar. 28, 1983

Related U.S. Application Data

[62] Division of Ser. No. 250,926, Apr. 6, 1981.

[51] Int. Cl.$^3$ .................. B65B 11/02; B65B 57/04
[52] U.S. Cl. .................. 53/399; 53/441; 53/465
[58] Field of Search .............. 53/441, 556, 587, 465, 53/64, 211, 389, 588, 399; 242/75.51, 7.13; 226/24, 108; 28/241, 245; 318/7; 26/51, 74

[56] References Cited

U.S. PATENT DOCUMENTS

| 2,285,654 | 6/1942 | Hanna | 318/6 |
| 3,586,222 | 6/1971 | Rosen | 226/108 |
| 3,707,658 | 12/1972 | Hilsenbeck | 318/7 |
| 4,095,318 | 6/1978 | Abbott | 53/556 |
| 4,302,920 | 12/1981 | Lancaster | 53/556 |
| 4,387,548 | 6/1983 | Lancaster | 53/441 |
| 4,458,467 | 7/1984 | Shulman | 53/587 |

FOREIGN PATENT DOCUMENTS

| 2750780 | 5/1979 | Fed. Rep. of Germany | 53/587 |
| 2281275 | 8/1974 | France | 53/556 |

Primary Examiner—John Sipos
Attorney, Agent, or Firm—Gipple & Hale

[57] ABSTRACT

A stretch wrapping system including apparatus and process is disclosed in which rotation of a noncylindrical or off-centered load draws film web at a continually fluctuating speed from a film roll through a prestretching device to wrap the load. The prestretching device includes an upstream roller coupled to a braking device and a downstream roller coupled to a positive torque device. The speed of the downstream roller is proportional to the take-up speed of the web on the load and the feedback device continually senses the speed of both rollers and adjusts the braking device so that the speed ratio of the rollers produces a constant stretch of the film web above its yield point. The feedback device also continually senses the forces contributed by the braking device and the torque device and continually adjusts the torque device so that the force on the web between the downstream roller and the load is held constant at a level below the yield point of the web. The feedback device may be connected to display systems to display the amount of web stretch, the web force to the load, and the amount of film web consumed in a wrapping operation.

18 Claims, 32 Drawing Figures

A    B    C

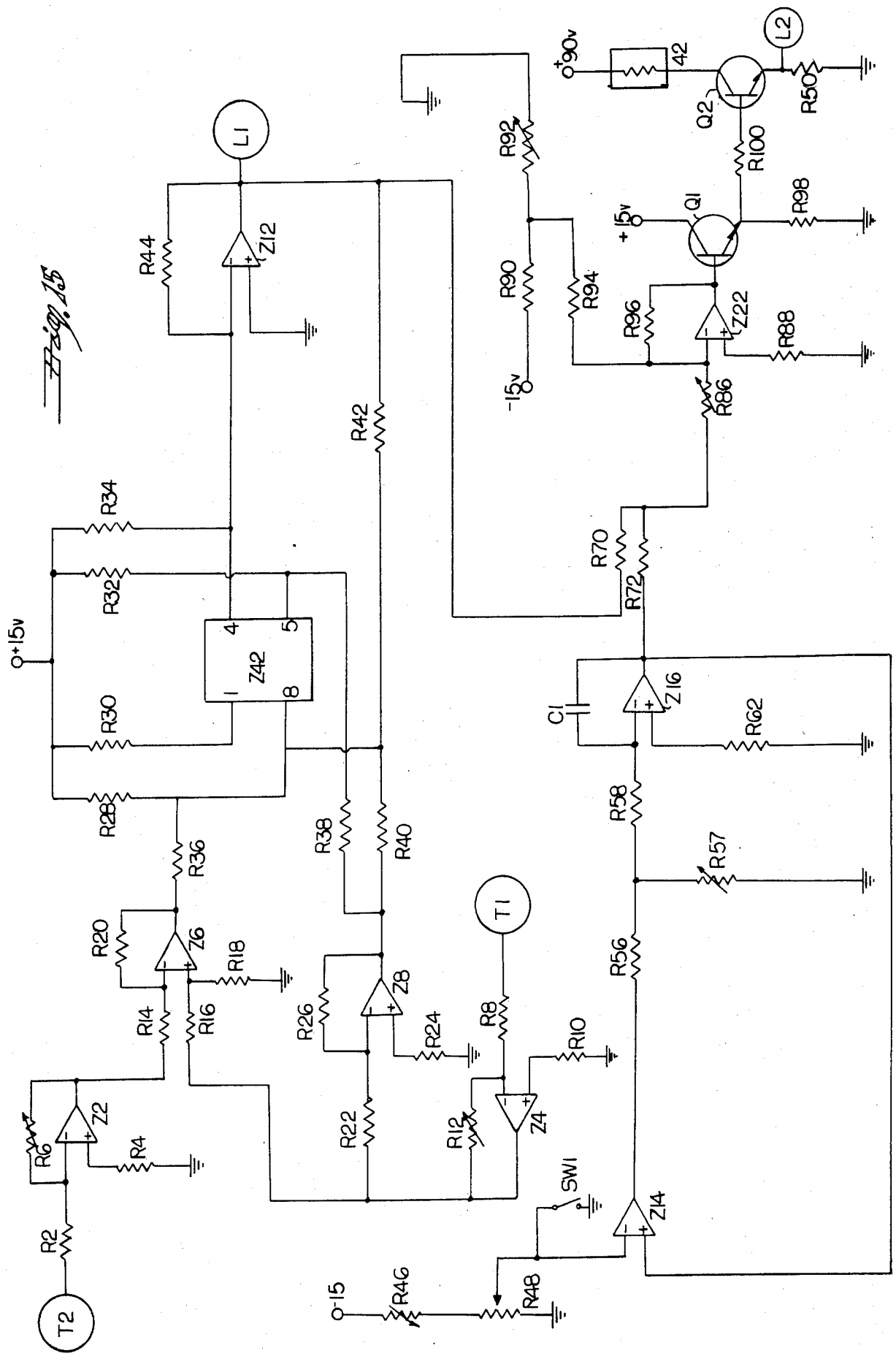

FEEDBACK CONTROLLED STRETCH WRAPPING APPARATUS AND PROCESS

This is a divisional application of Ser. No. 250,926, filed Apr. 6, 1981.

BACKGROUND OF THE INVENTION

The present invention generally relates to packaging and more particularly to an apparatus and method for making unitary packages which hold a plurality of components, each package containing a load wrapped in a web of stretched film.

Case packing or boxing is a common way of shipping multiple unit products. The multiple unit products are generally stacked in a corrugated box or are wrapped with kraft paper with the ends of the kraft paper being glued or taped. Another way of shipping such products is by putting a sleeve or covering of heat shrinkable film around the products and shrinking the sleeve to form a unitized package. The use of heat shrinkable film is described in U.S. Pat. Nos. 3,793,798; 3,626,654; 3,590,549; and 3,514,920. A discussion of this art is set forth in U.S. Pat. No. 3,867,806.

Another common method of wrapping loads is with rotary stretch wrapping machines. These rotary machines are commonly referred to as spiral or full-web machines, and can operate with the load rotating to pull stretched film web around it. Alternatively, the load can be stationary and stretched film wrapped around the load with a rotating film dispenser.

A typical state-of-the-art full-web apparatus is disclosed in U.S. Pat. No. 3,867,806.

The use of spiral wrapping machinery is well known in the art and representative machines are typified by U.S. Pat. Nos. 3,003,297; 3,788,199; 3,863,425; and 4,136,501.

Additional references of interest which are pertinent to rotatable drives for wrapping packages are disclosed in U.S. Pat. Nos. 3,820,451; 3,331,312; 3,324,789; 3,309,839; 3,207,060; 2,743,562; 2,630,751; 2,330,629; 2,054,603 and 2,124,770.

The film stretching apparatus on all currently marketed pallet stretch wrapping devices employ either direct or indirect friction to restrict the film as it is being wound onto the load during the wrapping process. The restriction is either applied to the roll of film itself (direct friction) or applied to the film after it is unwound from the film roll (indirect friction). The pallet and load serve as the winding mandrel providing all of the pulling force required to elongate the film.

The earliest type of stretch wrapper utilized a direct friction device in the form of a brake that is connected to the film roll through the core as shown in FIG. 1. The torque from the frictional brake device acted on the center of the film roll and as the roll changed diameter, the voltage to the brake was altered, either by the operator or automatically by a sensing device. A later film roll brake device, illustrated by U.S. Pat. No. 4,077,179, and FIG. 2 herein, utilizes a frictional brake attached to a shaft with a roller which is pressed against the freely mounted film roll. The film roll brake eliminates the need to change the brake force during the consumption of the film roll.

Various prior art indirect friction film stretching devices have been employed to restrict the film as it is wound onto the pallet during the wrapping process. One of these devices, commonly referred to as an "S" type roller device, is shown in FIG. 3, and utilizes an idle roller followed by a braked roller over which the film is threaded prior to wrapping the load. The function of the two rollers is to align the film for maximum contact with the braked roller. Another indirect friction device having fixed bars is marketed by Radient Engineering Corporation under the trade name POS-A-TENSIONER and has been subsequently marketed by the Kaufman Company under the trade name TNT. This device, shown in FIG. 4, has a series of fixed, non-rotating bars positioned adjacent to the film roll. The film web is threaded around the bars whose relative angles can be changed for ultimate tensioning. As the film web is attached to the pallet it is drawn across the bars and the friction between the film and the smooth surface of the bars provides a restriction causing the film to stretch. This device used multiple bars with the film web stretching incrementally between each bar. Neck down of the film web increases between each bar and the load bears the force. As the load rotates, the wrap angle changes from the last bar so that the wrapping force greatly varies depending on the relative angles. The frictional restraint is determined by the vector of the film web on each bar. Thus, the device is very sensitive to the force placed on the unwind roll and the force increases as the roll size decreases adding additional force on the system. Furthermore, there must be some friction placed on the supply roll to prevent backlash. While this device solves to some degree the irregularities of the brake and the hostility of the film roll, it can only apply limited stretch to the load and does not handle different film compositions with any degree of standardization.

Another stretch wrapper device was introduced by the Anderson Company at the PMMI Show in Chicago in 1978. This device interconnected the turntable drive motor with a pair of nip rollers immediately downstream from the film unwind roll, as shown in FIG. 5. The nip rollers were synchronously driven with the turntable rotation through a variable transmission which could be increased or decreased in speed relative to the turntable rotation speed. Thus, the stretch on the film was affected between the constant-speed nip rollers and the pallet turning. It is not known if this machine was ever commercialized, principally because of its inability to achieve satisfactory stretch over the load corners due to its failure to respond to the speed change that these corners represented. The pallet, as the film accumulating mandrel, provided the total force that was required to stretch the film from the driven nip rollers with all of the stretch occuring after the passage of the single pair of nip rollers to the pallet.

In addition to the previously noted prior art, direct friction pallet stretch wrapping machines of the pass through type have been manufactured by Weldotron and Arenco (Model No. MIPAC). These machines have a significant problem in stretching the film and normally stretch film around the load in the range of about five to ten percent. These machines depend on being able to drive the pallet and associated load through a stretched curtain of film to place the stretching force on the front or sides of the load.

Since most pallet loads will not hold together while being subjected to these unequal forces, the film web is normally tensioned after the film seal jaws begin their inward travel over the end of the pallet load. This form of tensioning severely limits the degree of elongation of film which is able to be achieved and pulls excess film around the two rear corners of the load while the jaws are closing. This frequently causes film tears when the film is stretched more than ten percent.

When low stretch rates of one to ten percent are produced, several packaging problems occur. The unitizing containment forces on the load are less than the optimum force which can be obtained. This minimizing of containment forces can result in a potential loosening of the film wrap during shipment where the load settles and moves together thereby reducing the girth.

Another pass through machine described by French Pat. No. 2,281,275 assigned to SAT discloses the pre-stretching of plastic film by taking the film web from the film roll through a powered roller system having a speed differential of $V_2-V_1$ which stretches the film. The film leaving the second set of rollers is drawn off at a speed which is equal to or less than $V_2$ as it is wrapped around the load. V, which is the speed of rotation of the pallet load, is less than or equal to $V_2$, the speed of the stretched film coming off of the second roller assembly.

Although the French Patent appears to achieve film web stretch in excess of the one to ten percent range obtained in the aforementioned pass through stretch wrapping machines, other problems remain. The system required manual operation or complex automatic feedback to accomodate the change in film take-up speed as the pallet load surfaces pass by the downstream rollers. This reference does not teach the benefit of stretching the film above the yield point with increased strength per cross-sectional area and increase in modulus. There is furthermore no teaching of reducing the force on the portion of the film web between the downstream powered rollers and the load with inelastic strain recovery as a technique for reducing wrapping force while holding high levels of elongation.

A commercial model based on FIG. 8 of the '275 reference is currently being marketed by SAT. In this embodiment the film web is pre-stretched by extending a pair of rollers forward while braking the film rolls. The load is carried into the pre-stretched "U" shaped sleeve and the rollers are transported behind the load allowing the sleeve to engage the load. Sealer bars are then projected inward to seal the web ends together.

The aforementioned stretching devices do not maintain a consistent force in stretching the film web. These brake devices are subject to variation due to their physical construction and their sensitivity to speed change caused by passage of corners of the load and the resultant sudden speed-up and slow-down of film drawn from the feed roll.

The elasticity of the stretched plastic film holds the products on the load under more tension than either the shrink wrap or the kraft wrap, particularly with products which settle when packaged. The effectiveness of stretch plastic film in holding a load together is a function of the containment or stretch force being placed on the load and the ultimate strength of the total layered film wrap. Containment force is currently achieved by maximizing elongation until just below a critical point where breaking of the film would occur. Virtually all stretch films on the market today including products of Mobil Chemical Company (Mobil-X, Mobil-C and Mobil-H), Borden Resinite Division PS-26, Consolidated Thermoplastics, Presto, PPD, and others are consistently stretched less than thirty percent in most commercial applications despite a manufacturer's laboratory rated capacity in excess of three hundred percent in most cases.

This problem of obtaining less stretch on commercial wrapping than that available under laboratory conditions centers on several facts. A square or rectangular pallet which is typically positioned off of its center of rotation is used as the wind up mandrel for the purpose of stretching film. A typical 40"×48" pallet positioned 3 to 4 inches off of its center of rotation will experience a speed change and force change of up to 60% within one quarter revolution of the turntable.

In this regard, FIGS. 17 through 21 illustrate the manner in which constant rotation of a palletized load placed slightly off center on a turntable will result in significant variations in tension on the film web being wrapped around the load. Since the turntable rotates at a constant angular speed, the film web is drawn to and around the rotating pallet load at a speed which is determined by the distance between the axis of rotation and the point at which the web contacts the load. The axis of rotation in each of the illustrations is at point A and the distance between the axis and the film contact point is illustrated by an arrow B. The axis of rotation A is offset slightly from the true geometric axis C of the palletized load. It can thus be seen that as the load is rotated in a clockwise direction, the distance from the axis of rotation A to the film web contact point remains constant in FIGS. 17 through 20. However, as the load is rotated from the position shown in FIG. 20 to its position shown in FIG. 21, the distance between the axis of rotation and the film contact point increases markedly, thus increasing the speed at which the film is drawn from the roller and the force between the downstream stretch roller and the pallet load. Therefore, the maximum force which may be applied to film web over the considerable distance between the downstream roller and the load without destroying the web is well below the force needed to achieve stretch approaching the theoretical maximum.

In addition to the off centering problem most pallet loads are irregular in shape with vertical profiles which products a significant puncture hazard to highly stretched film being wound around them. Further, some unit loads are very susceptible to crushing forces of the stretched film. Because of pallet load changes and inconsistencies within the film roll, the operator typically continues to reduce the tension settings until there are no failures. Thus the inconsistencies of films, stretching devices, and pallet loads produce an environment where very few stretch films are actually stretched to their optimum yield.

The major problem with current stretch technology is that stretch is produced by frictional force devices to restrict the film travel between two relatively hostile bodies. On the one hand the film roll is subject to edge wandering and feathering, while on the other hand the rotating pallet with its irregular edges and rapidly changing wind-up speeds severely limits the level of elongation achieved. The ultimate holding forces of the film cannot be brought to bear on the load because the film cannot be stretched enough. Even if the film could be stretched enough the high wrapping forces can disrupt or crush many unit loads. The use of high modulus films, such as oriented films, does not produce the yield benefits of the current invention, since these higher modulus films would have to be significantly stretched in order to achieve the rubberband effect and moldability required for irregular loads.

It therefore can be understood, since the pallet provides the forces for stretching the film, that stretch percentages achieved on the pallet and the stretch force achieved are intertwined in all prior art devices. As previously indicated, high stretch percentages are required to achieve the benefits of high yield but the high stretch forces incurred at these high stretched percentages cause premature film rupture and potential crushing of the load. In the prior art, a stretch force less than 30 lbs. for a 20" wide web has therefore been used, to avoid these risks.

In an attempt to solve the aforementioned problems several other devices have been developed for the assignee of the present invention.

One device called the powered stretch embodiment stretches the film web above its yield point between two sets of powered rollers prior to transporting the film to the pallet, increasing its modulus while reducing its cross-sectional area.

Since the film stretches between the rollers, all stretching action is isolated from the roll and the pallet. It also removes the dependence of the stretch force and elongation level. While the device can be used to wrap light or crushable loads it has several problems in actual use. The device does not include feedback controls required to sense force change and maintain the force level.

Another known device manufactured by Lantech Inc., under the trademark "ROLLER STRETCH" utilizes the film web to drive the apparatus. This device addresses several of the aforementioned problems. Since the film is pre-stretched between the rollers, it isolates the stretching action from between the film roll and the pallet. This device provides a consistent level of stretch and, most importantly, responds to force and speed changes without complex feedback controls as can readily be seen in the graph of FIG. 22. A problem inherent with the ROLLER STRETCH device is that it has a dependence between the percentage of stretch that can be achieved and the stretch force that will be required to elongate the film. It should be noted that although these two factors are connected, the film web drive device significantly lowers the stretch force for a given elongation level, at or below the balance point as is seen by FIG. 23. This is due to the mechanical advantage between the film driven rollers.

Balance is achieved when elongation between the rollers ($E_1$) is equal to elongation on the load ($E_2$). The relatively higher forces between the closely spaced rollers are overcome by the lower force required to drive the device by the film between the roll and the load. The stress/strain curve experienced between closely spaced rollers is substantially higher than the curve where film is allowed to expend the pulling force. Thus, the film to the load effects this higher force between the rollers aided by the mechanical advantage of the differential pulley relationship of the gear connected rollers. At balance point the elongation on the load ($E_2$) equals elongation between the rollers ($E_1$) and the mechanical advantage represents the differences between the forces corrected for friction. This limits the film drive device to an elongation level on most presently marketed films of under 120 percent elongation between the rollers.

Yet another known device is manufactured by Lantech Inc. under the trademark "POWER STRETCH." In this device the film passes between rollers in a stretching assembly configuration for optimum film surface friction to avoid slippage. The rollers are interconnected by a gear or other speed ratio means, so that the wrapping of the film around the load will drive a downstream roller interconnected to an upstream roller at a ratio preselected for optimum stretch of the particular film composition. The entire roller means may be mounted for movement along a horizontal axis so that the upstream roller can be urged against the film roll, thus avoiding backlash while maintaining very low friction on the unwind shaft. A constant positive torque means is connected by a spur gear or other means to the downstream roller to provide some portion of the force that it required to operate the stretching assembly. Thus, the force placed on the film web between the downstream roller and the pallet can be reduced to the optimum level. Since it is the interconnection by the film to the turntable which is driving the stretching assembly, speed changes on the load surfaces are transmitted back to the upstream roller, speeding up and slowing down the rollers as necessary in order to keep a relatively constant force and stretch level.

It is therefore apparent that there exists a need for a pallet load wrapping apparatus which reduces or eliminates the dependence between the percentage of stretch that can be achieved and the force exerted by the load that will be required to drive the prestretch device.

SUMMARY OF THE INVENTION

The present invention is generally directed toward a stretch wrapping system and more specifically to a stretch wrapping system in which the film web is prestretched over the yield point. In the invention, force applied to the film web between the downstream roller and the load is held constant at a level set by the system operator, despite film web take-up speed changes induced by a load which is off-centered or irregular in shape. The system of the present invention also maintains the level of prestretch between the upstream roller and the downstream roller at a constant level regardless of the take-up speed and the force on the web between the downstream roller and the load. Furthermore, both the prestretch and the force between the downstream roller and the load may be adjusted by the operator prior to or during a wrapping cycle without the requirement of a corresponding adjustment in the other factor. Thus, the prestretch between the upstream and downstream rollers may be maintained at a level approaching the theoretical maximum and the force between the downstream roller and the load may be maintained well below a 30 lb. level which risks destruction of the web, achieving a high degree of overall stretch following inelastic recovery of the web.

The invention comprises a pallet wrapping apparatus including roller means comprising an upstream roller and a downstream roller. The surface of the upstream and downstream rollers are configured for optimum friction with film web passing between the rollers in order to maximize prestretch and minimize slippage. The present invention increases the length of the film web at the expense of its thickness or gauge while maintaining a significant proportion of its film web width. Therefore, the spacing between the upstream and downstream rollers is relatively small in order to avoid neckdown of the film during prestretch. The roller means may be mounted for movement along a horizontal axis so that the upstream roller may be urged against the film feed roll to interconnect the upstream roller and feed roll by friction, thus avoiding feed roll backlash while maintaining very low friction on the feed roll shaft.

The downstream roller is driven by a variable torque device acting to contribute torque in the same direction as rotation of the downstream roller, and the upstream roller is restrained by a braking device acting to contribute torque in a direction opposite the direction of rotation of the roller. A first feedback means is provided to monitor the rotation speeds of the upstream and downstream rollers and to adjust the upstream roller restraint provided by the braking device in order to maintain a constant predetermined rate of prestretch between the rollers. A second ieedback means is provided to determine the force components contributed by the braking device and the torque device and to adjust the torque device in order to maintain a constant predetermined force on the web between the downstream roller and the load.

The present invention operates without the need for interconnection gears between the upstream and downstream rollers, and therefore allows an infinitely variable film elongation ratio as well as avoidance of wear and tear on gears and the necessity of obtaining multiple sets of gears for different gear ratios.

Film elongation may be achieved in the present invention in excess of three hundred percent offering significant economies in film costs without damage to delicate loads and destructive uneven stresses on the film web which are recognized as prevalent deficiencies in the prior art. High elongation levels have been found to significantly increase ultimate film strength when elongation occurs between closely spaced rollers where neckdown can be virtually eliminated. Tests have indicated that ultimate strength of Mobil-X and Bemis ST-80 increases over twenty percent after having been elongated one hundred and forty percent between two rollers spaced one-half inch apart. This strength increases in addition to the increase in strength per cross-sectional area. Thus, the invention provides for consistent force wrap with a higher wrap yield per pound of plastic.

The wrap has a high resistance to load shift with low neckdown during wrapping and no stress relaxation of the wrap in many films. The invention has the ability to wrap light or crushable loads or irregular loads which may require additional reduction of the wrapping force.

Thus, the present inventive system achieves a precise constant level of prestretch of the film web entirely independent of the varying take-up speed of the load, as well as a precise constant level of force exerted by the load on the web also independent of the varying take-up speed of the load. Furthermore, the system operator is provided with display means providing indication of the precise level of stretch and load force, and may adjust these parameters during the course of a wrapping operation. The adjustment means for these parameters allow continuously variable adjustment rather than the broad incremental adjustments available through use of gears or other mechanical devices to control prestretch ratios in prior art systems. An operator of the system is also provided with a display of the linear measure of film used to wrap a given load, which is a precise indication of the economies achieved with the present inventive system.

It can therefore be appreciated that the system substantially eliminates the risk inherent in prior art systems where the force exerted by the load varies, and the inefficiencies in prior art systems where wrapping must be stopped in order to adjust the prestretch ratio, and where the prestretch ratio cannot be known except by inspection of the gears or other mechanical devices, again during interruption of the wrapping operation.

These and other objects and advantages of the present invention will be more readily apparent when the following detailed description thereof is read in conjunction with the accompanying drawings.

BRIEF DESCRIPTION OF THE DRAWINGS

FIG. 15 is a diagram of a circuit corresponding to the first feedback circuit of FIG. 12;

DETAILED DESCRIPTION OF THE DRAWINGS

Figure 13:
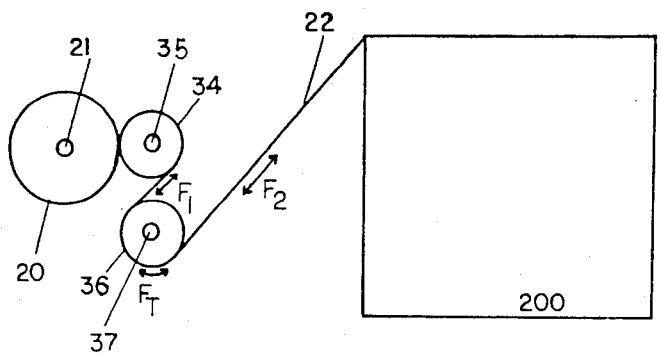
FIG. 13 is an isolated schematic top plan view of the inventive apparatus including the film web and load.

The inventive wrapping apparatus 10 is shown in FIGS. 6 through 32, with the preferred embodiment and best mode of the invention being shown in FIGS. 6 through 16. The operation and description of the apparatus and its respective component parts is discussed in the following description.

The stretch wrapping apparatus 10 comprises an upright frame 12 sitting on a base 14. In the preferred embodiment and best mode of the invention, a carriage 16 is moveably mounted on the frame 12 by means of rollers 13 rotatably mounted on tracks 15 secured to the frame. The carriage has a motor 17 mounted on it to provide the power for a rack and pinion drive 19. However, chain or other suitable drive means can be used. These drive means are well known in the art and are typified by machine Model Nos. SVS-80, SVSM-80, STVS-80, STVSM-80 and SAHS-80 manufactured by Lantech Inc. The apparatus 10 may also be a full-web apparatus with the carriage removed as is well known in the art. Such machines are typified by machine Model Nos. S-65, SV-65, and SAH-70 manufactured by Lantech Inc. A typical state-of-the-art full-web machine is also disclosed in U.S. Pat. No. 3,867,806.

A film unwind stand 18 which is well known in the art is mounted on the carriage 16, or base 14 in the case of a full-web machine. The stand is constructed to allow smooth film to unwind from film roll 20 to a first or upstream roller 34 and then to a second or downstream roller 36. The rollers 34 and 36 are closely spaced together preferably in the range of ¼ inch to 2 inches and no farther than 7 inches and are rubber faced for maximum film contact. This close relationship of the rollers prevents significant neckdown of the film with the stress/strain curve on the film being substantially higher than the curve where film is allowed to freely neck down during stretching. Since most films, except linear low density polyethylene, reach their yield point before thirty percent elongation, the speed relationship of the rollers should be variable from thirty percent to beyond three hundred percent to allow use on all stretch films which are currently available in the marketplace.

EVA copolymer films of high EVA content such as the film manufactured by Consolidated Thermoplastics "RS-50" and PPD "Stay Tight" are preferably pre-stretched over one hundred thirty percent. PVC films such as Borden Resinite "PS-26" are best pre-stretched at levels of over forty percent. Premium films such as Mobil-X, Presto SG-4, Bemis ST-80 and St. Regis utilize a new low pressure polymerization process resin manufactured by Union Carbide and Dow Chemical Company. This resin, called linear low density polyethylene, has significantly different stretch characteristics which allow the film to withstand the high stress of over three hundred percent elongation during pre-stretch without tearing during wrapping of the pallet.

The entire roller assembly 55 can be mounted for movement on a horizontal axis so that the upstream roller 34 can be urged against the film roll to engage the upstream roller by friction to the film roll to avoid backlash while maintaining very low friction on the unwind shaft.

A brake 42 is coupled to shaft 35 of upstream roller 34. Brake 42 adjusts the speed of roller 34 as a function of the speed of downstream roller 36 in order to maintain a constant speed ratio of rollers 34 and 36 in the range discussed above. Tachometers 48 and 50 are coupled to shafts 37 and 38, respectively, to measure the rotation speeds of the rollers. A first feedback means 44, described in detail below, is coupled to tachometers 48 and 50 to control brake 42 according to a speed ratio preset by the operator of the apparatus. A positive torque device 40 is coupled through constant reducer gearbox 41 to shaft 37 of downstream roller 36. The positive torque device 40 drives the downstream roller 36 to reduce the forces on the load while the film is being stretched. The interconnection of the positive torque device 40 provides a portion of the force that is required to rotate rollers 34 and 36. Thus the force placed on the film between the downstream roller 36 and the pallet can be reduced to a constant optimum level. The winding force required on the part of the rotating pallet is less than it otherwise would be. The function of the torque device 40 is therefore analogous to power steering in an automobile. Preferably, the force between the rollers 34 and 36 is greater than that between the downstream roller 36 and load 200.

The torque device 40 is controlled by second feedback means 46 which is coupled to torque device 40 and brake 42. The force exerted on the film web is shown schematically in FIG. 13. The force exerted on the film web 22 between downstream roller 36 and load 200 is designated $F_2$, and the force exerted on the film web 22 between upstream roller 34 and downstream roller 36 is designated $F_1$. Since brake 42 acts to restrain film web 22 from moving to load 200, the force exerted by brake 42 equals F1. Since downstream roller 36 is coupled to torque device 40, the force exerted on the web 22 by roller 36 is $F_T$, which may be computed by the equation:

$$F_T = T_{40}/R_{36}$$

where $T_{40}$ is the torque provided by torque device 40 and $R_{36}$ is the radius of roller 36, a constant. Likewise, the force exerted by brake 42 may be computed as:

$$F_1 = T_{42}/R_{34}$$

where $T_{42}$ is the torque of the brake and $R_{34}$ is the radius of roller 34, another constant. The overall force equation on film web 22 is $$F_1 = F_2 + F_T$$

and second feedback means 46 controls $T_{42}$ in order to hold $F_2$ constant at a level preset by the system operator even while $F_1$ changes in response to changing film web take-up speed.

Since the positive torque device 40 drives roller 36 by adding a controlled torque, rather than a constant angular rate, speed changes on the haul off of the film will be transmitted back to the rollers 34 and 36 increasing and decreasing speed in response to the changing effective diameter of the load 200 as previously discussed and shown by FIGS. 17 through 21, thus keeping a substantially constant force and stretch level. The torque device 40 will allow balance to be achieved at higher film elongation levels than that of the ROLLER STRETCH device which is only driven by the, turntable rotated pallet load interconnected to the film web. At the point when the mechanical advantage will not overcome the difference in force between the amount to stretch the film between the rollers and the amount to the elongation to the load, the torque device becomes essential. The film Mobil-X reaches this balance point at 110% with the ROLLER STRETCH embodiment.

Up to and above 300% ratio selections are possible with torque assistance to overcome the higher stretch forces between the rollers. Thus, the torque assistance must make up for the loss in mechanical advantage as the speed ratio is increased for higher elongation on the load. It can be seen that the system of the present invention has all the advantages of ROLLER STRETCH, plus the ability to significantly increase the level of film elongation on the load and establish a constant force $F_2$ independent of both $F_1$ and the stretch ratio E between the rollers 34 and 36.

Figure 12:
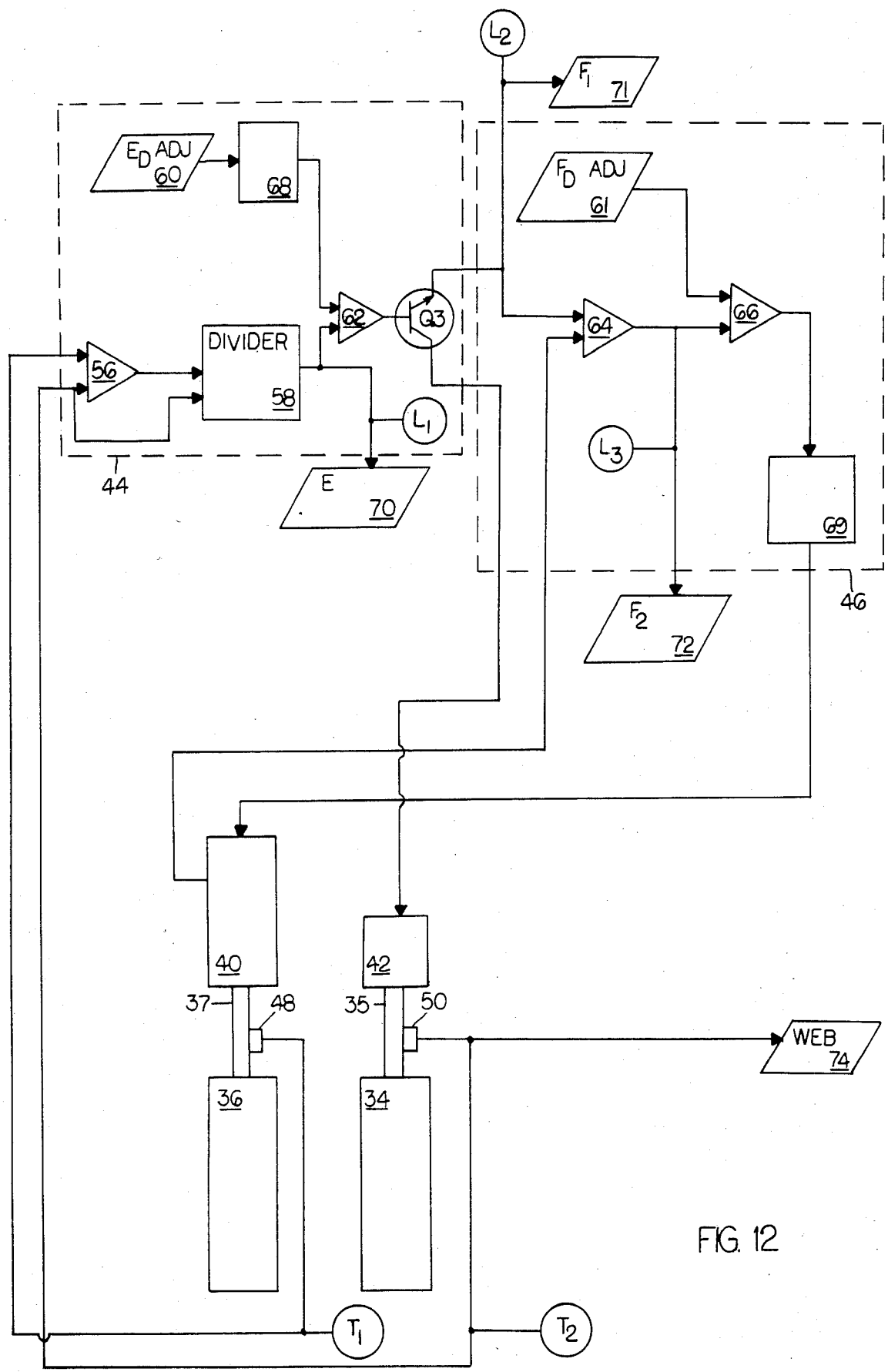
FIG. 12 is an isolated schematic view of the film stretching assembly and block diagram of the regulatory circuit of the present invention.

The operational basis of first feedback means 44 and second feedback means 46 can be best understood by referring specifically to FIG. 12. A tachometer 48 is attached to shaft 35 of upstream roller 34, and produces a signal corresponding to the angular velocity $V_1$ of roller 34 on line $T_1$. Likewise, tachometer 50 is attached to shaft 37 of upstream roller 36 and produces a signal corresponding to the angular velocity $V_2$ of roller 36 on line T2. The pre-stretch ratio applied to film web flowing from upstream roller 34 to downstream roller 36 can therefore be expressed as $E=(V_2-V_1)/V_1$. In the first feedback means 44, this ratio is calculated by coupling lines T1 and T2 to comparator 56, the output of which is the signal corresponding to $V_1-V_2$. This output is coupled to analog divider 58, and T1 is also coupled to analog divider 58. The output of divider 58 is also coupled to L1 and is a signal corresponding to $-E$. Line L1 can be coupled to any appropriate display system 70 incorporating analog to digital converters, counters and readouts, as needed, to display the current level of elongation to the operator of the system. There are a variety of well known display systems available at the present time including liquid crystal displays, digital segment LED displays, and panel meter displays, all of which may readily be used as a display system 70.

A desired elongation level $E_D$ may be adjusted by manipulation of pre-stretch adjustments means 60. The output of adjustment means 60 is fed through soft start circuit 68 and coupled to comparator 62, to which is also coupled to line L1. Comparator 62 is configured so that its putput is a signal corresponding to $E-2E_D$. The output of comparator 62 is coupled to the base of transistor Q2. The collector of Q2 is coupled to brake 42, and the emitter of Q2 is coupled to line L2. Thus, the signal to brake 42 will slow roller 34 when the actual elongation E is less than the desired elongation $E_D$, and allow roller 34 to increase speed when the actual elongation E is greater than the desired elongation $E_D$.

Signals corresponding to the forces exerted by rollers 34 and 36 are coupled from, respectively, line L2 and torque device 40 to comparator 64, which produces a signal corresponding to $F_2=F_1-F_T$. The output of comparator 64 is coupled to line L3 which may be coupled to a load force display means 72 of any well known coventional types discussed above with reference to display 70.

Load force adjustments means 61 may be manipulated to adjust the force $F_D$ desired to be exerted on the load. The output of adjustments means 61 is coupled to comparator 66, as is line L3. Comparator 66 is configured to produce an output corresponding to $F_2-2F_D$. The output of comparator 66 is coupled through soft start means 69 to torque device 40. Thus when the actual force $F_2$ exceeds the desired force $F_D$, second feedback means 46 will cause the force exerted by downstream roller 36 to increase. When $F_D$ exceeds $F_2$, the force contributed by roller 36 will decrease accordingly.

Line L2 may be coupled to prestretch force $F_1$ display 71 and the output of tachometer 50 may also be coupled to web consumption display 74. Again, these displays may be any well known type such as those discussed with regard to display 70.

FIG. 15 illustrates a circuit corresponding to the block diagram of first feedback means 44 and related components.

The output of tachometer 48 is coupled through line T1 and resistor R8 to the negative input of operational amplifier Z4. The positive input of Z4 is coupled through resistor R10 to ground, and the output of Z4 is coupled through variable resistor R12 to the negative input of Z4. Likewise, the output of tachometer 50 is coupled through line T2 and resistor R2 to the negative input of operational amplifier Z2. The positive input of Z2 is coupled through resistor R4 to ground, and the output of Z2 is coupled through variable resistor R6 to the negative input of Z2.

The output of Z2 is coupled through resistor R14 to the negative input of operational amplifier Z6, and the output of Z4 is coupled through resistor R16 to the positive input of Z6. The positive input of Z6 is also coupled through resistor R18 to ground, and the output of Z6 is coupled through resistor R20 to the negative input of Z6. The output of Z4 is also coupled through resistor R22 to the negative input of operational amplifier Z8, and the positive input of Z8 is coupled through resistor R24 to ground. The output of Z8 is coupled through resistor R26 to the negative input of Z8. Z6 is configured to produce a signal corresponding to the difference between the output cf tachometer 48 and the output of tachometer 50, and integrated circuit Z42 is configured to act as an analog divider, producing as an output the result of dividing the output of Z6 by the output of Z8. In other words, the output of Z42 is a signal corresponding to the speed difference between upstream roller 34 and downstream roller 36 divided by the speed of upstream roller 34. In this embodiment, Z42 may be a Raytheon RC4200 integrated circuit, although any other integrated circuit or combination of components producing a similar function may be equally useful.

The output of Z6 is coupled through resistor R36 to pin 8 of Z42, and pin 8 is also coupled through resistor R28 to a 15 volt source. The output of Z8 is also coupled through resistor R40 to pin 8 of Z42. Pin 1 of Z42 is coupled through resistor R30 to a 15 volt source. The output of Z8 is coupled through resistor R38 to pin 5, and pin 5 is also coupled through resistor R32 to a 15 volt source. Pin 4 of Z42 is coupled through resistor R34 to a 15 volt source, as well as to the negative input of operational amplifier Z12. The positive input of Z12 is grounded, and the output of Z12 is coupled through resistor R44 to the negative input of Z12 and through resistor R42 to pin 8 of Z42. The output of Z12 is the difference ratio described above, which indicates the actual level of pre-stretch produced on film web 22 between upstream roller 34 and downstream roller 36, and is coupled through line L1 to a circuit comprising display means 70. The output of Z12 is also coupled through resistors R70 and R86 to the negative input of operational amplifier Z22.

The operator of the system of the present invention may adjust the amount of pre-stretch by adjustment of potentiometer R48. A −15 volt source is coupled through variable resistor R46 and potentiometer R48 to ground, and the wiper of R48 is coupled to the negative input of operational amplifier Z14. A single pole single throw switch SW1 is also connected to the negative input of Z14, to make or break a contact with ground. The output of Z14 is coupled through resistors R56 and R58 to the negative input of operational amplifier Z16. The negative input of Z16 is also coupled through R58 and variable resistor R57 to ground. The positive input of Z16 is coupled through resistor R62 to ground, and the output of Z16 is coupled through capacitor C1 to the negative input of Z16. The output of Z16 is also coupled directly to the positive input of Z14. Z16, R46 and parts coupled. therebetween comprise a soft start circuit which gradually increases the pre-stretch level from zero to the level set by the operator when SW1 is open.

The output of Z16 is coupled through resistors R72 and R86 to the negative input of operational amplifier Z22. The positive input of Z22 is grounded through resistor R88. The output of Z22 is fed back through resistor R96 to the negative input of Z22. A negative 15 volt source is coupled through resistor R90 and varriable resistor R92 to ground, and through R90 and resistor R94 to the negative input of Z22. Resistors R90 and R92 act as a voltage divider to provide a transistor bias offset voltage for transistors Q1 and Q2. The output of Z22 is coupled to the base of transistor Q1, and the collector of Q1 is coupled to a 15 volt source. The emitter of Q1 is coupled through resistor R98 to ground and through resistor R100 to the base of transistor Q2. The emitter of Q2 is grounded through resistor R50 and the collector of Q2 is coupled through brake 42 to a 90 volt power supply source. The emitter of Q2 is also coupled to line L2.

Figure 16:
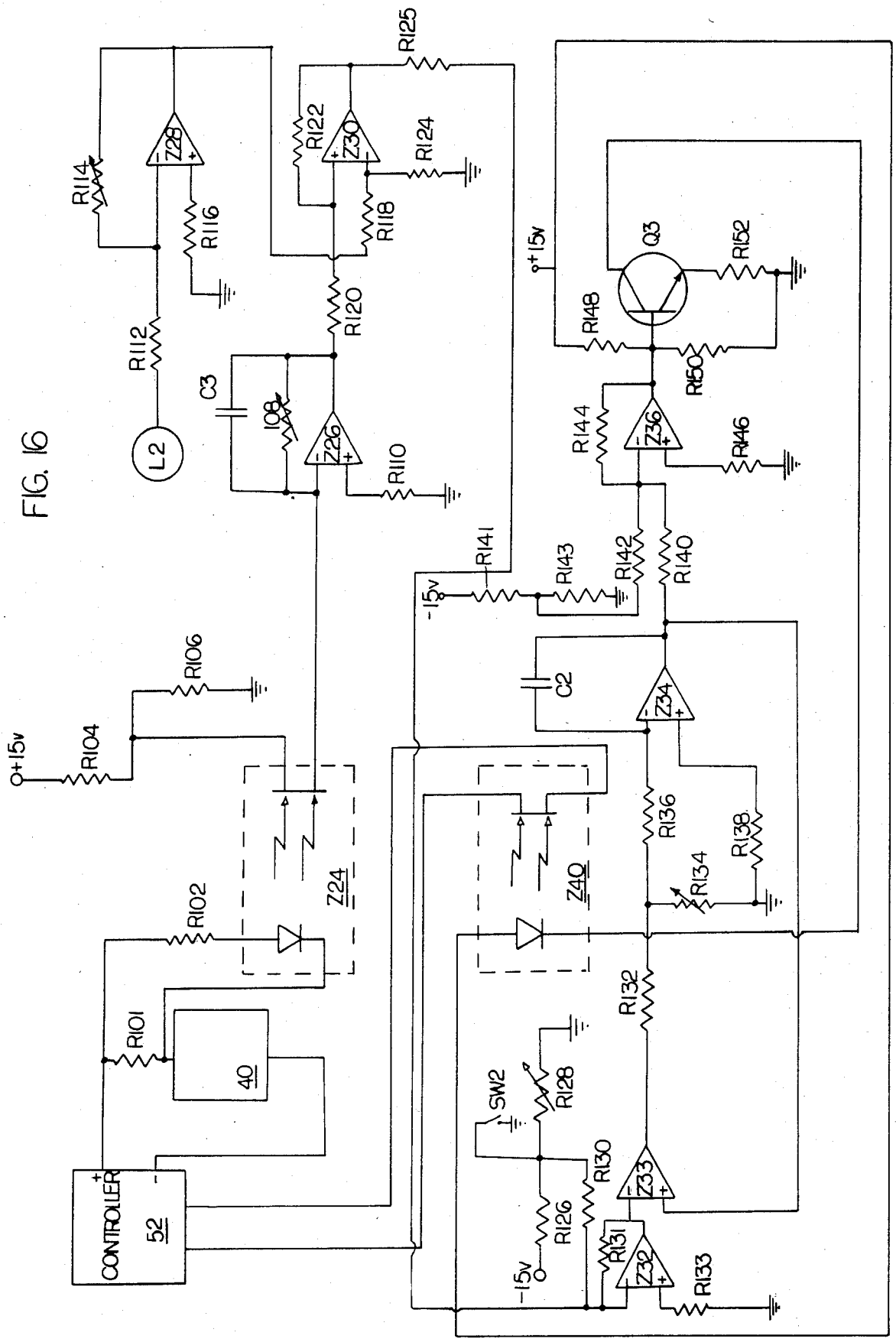
FIG. 16 is a diagram of a circuit corresponding to the second feedback circuit of FIG. 12.
Figure 17:
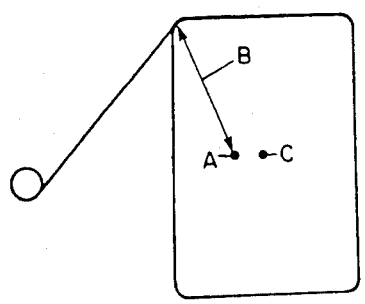
FIG. 17 is an isolated schematic top plan view of a palletized load at the beginning of the wrap cycle in a stretch wrapping apparatus.
Figure 20:
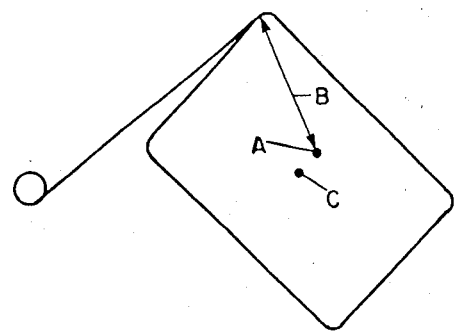
FIG. 20 shows a sequential schematic view of the palletized load of FIG. 17 rotated through an angle of 135 degrees.
Figure 18:
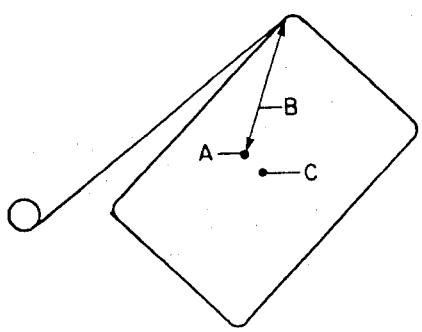
FIG. 18 shows a sequential schematic view of the palletized load of FIG. 17 rotated through an angle of 45 degrees.
Figure 21:
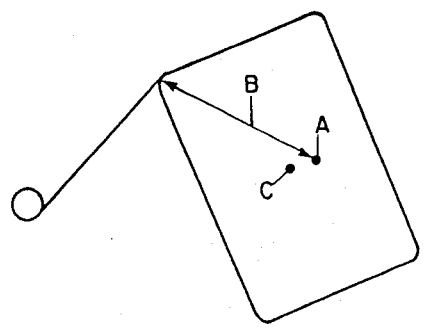
FIG. 21 shows a final schematic view of the palletized load of FIG. 17 rotated through an angle of 160 degrees.
Figure 19:
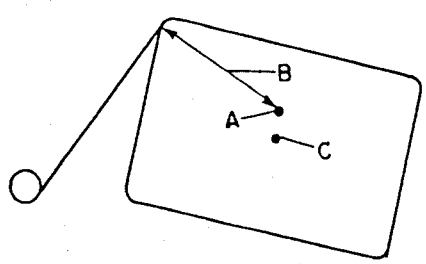
FIG. 19 shows a sequential schematic view of the palletized load of FIG. 17 rotated through an angle of 100 degrees.

Turning now to FIG. 16, a circuit is disclosed corresponding to the second feedback means 46. Torque controller 52 controls the amount of torque provided by torque device 40 to downstream roller 36. The positive output of torque controller 52 is coupled to an input of torque device 40 through resistor R101. The positive output of controller 52 is also coupled through resistor R102 and the inputs of opto-isolator Z24 to the same input of the torque device 40, and returned from torque device 40 to the negative output of controller 52. The outputs of Z24 emit a signal proportional to the torque contributed by torque device 40 to downstream roller 36. A 15 volt source is coupled through resistors R104 and R106 to ground, as well as through resistor R104 and the outputs of Z24 to the negative input of operational amplifier Z26. The positive input of Z26 is grounded through resistor R110, and the output of Z26 is fed back through variable resistor R108 and capacitor C3 is parallel to the negative input of Z26.

A signal corresponding to the force F1 developed by braking device 42 is coupled from line L2 through resistor R112 to the negative input of operational amplifier Z28. The positive input of Z28 grounded through resistor R116, and the output of Z28 is coupled through variable resistor R114 to the negative input of Z28. The output of Z28 is also coupled through resistor R118 to the positive input of operational amplifier Z30. The output of Z26 is coupled through resistor R120 to the negative input of Z30. The positive input of Z30 is grounded through resistor R124, and the output of Z30 is fed back through resistor R122 to the negative input of Z30. Thus, the signal provided by the output of Z30 will be proportional to the difference between the force developed by braking device 42 and the force developed by torque device 40, which corresponds to the force F2 on web 22 between downstream roller 36 and load 200.

The operator may adjust the desired force F2 by adjusting variable resistor R128. A minus 15 volt source is coupled through resistors R126 and R128 to ground, as well as through resistors R126 and R130 to the negative input of operational amplifier Z32. The output of Z32 is fed back through resistor R131 to the negative input of Z32. The positive input of Z32 is grounded through resistor R133. The negative input of Z32 is also coupled through resistor R125 to the output of Z30 as well as through R130 to single pole single throw switch SW2 which makes or breaks a contact to ground. The output of Z32 is coupled to the negative input of operational amplifier Z33. The output of Z33 is coupled through resistors R132 and R136 to the negative input of operational amplifier Z34 as well as through R132 and variable resistor R134 to ground. The positive input of Z34 is grounded through resistor R138. The output of Z34 is coupled to the positive input of Z32. The output of Z34 is also coupled through capacitor C2 to the negative input of Z34.

Operational amplifiers Z34 and Z33 and components coupled therebetween comprise a damping circuit which, upon start up of the system, will bring the level of torque provided by motor 40 up from zero to the level preset by operator adjustment of R128. The damping circuit will also gradually decrease torque to zero when the system is shut down.

The output of Z34 is coupled through resistor R140 to the negative input of operational amplifier Z36. A minus 15 volt source is coupled through resistors R141 and R142 to the negatiLve input of Z36, and through R141 and resistor R143 to ground. The output of Z36 is fed back through resistor R144 to the nega.tive input of Z36. The positive input of Z36 is grounded through resistor R148. Thus, the output of Z36 is a signal corresponding to. the difference between twice the force F2 desired by the operator and the actual force F2 exerted by the system. The output of Z36 is coupled to the base of transistor Q3, and through resistor R150 to ground. The emitter of Q3 is grounded through resistor R152. A 15volt source is coupled through resistor R148 to the base of Q3, and through the inputs of optoisolator Z40 to the collector of Q3. The outputs of Z40 are coupled to the controller inputs of controller 52.

In a working embodiment of the present invention, the following component values were utilized. However, these values are present for purposes of illustration only and not as a limitation of the invention. Those of average skill in the field, will readily recognize that such values can be varied substantially without departing from the scope and spirit of the present invention.

Resistors

56: R102
220: R152
240: R100
510: R106
1.33K: R44
1.5K: R116
2K: R112
3.3K: R50
3.9K: R141, R148
4.7K: R98, R110
5K: R48 (pot), R114 (variable), R92 (variable), R128 (variable)
5.1K: R46, R126, R143, R150
6.66K: R42
7.5K: R90
10K: R4, R10, R134 (variable), R57 (variable), R108 (variable)
20K: R104
24K: R2, R8
25K: R60 (variable)
33K: R133
47K: R14, R16, R18, R20, R22, R24, R26, R82, R88, R118, R120, R122, R124, R146
50K: R6 (variable), R38, R12 (variable)
60K: R30
75K: R56, R132
100K: R58, R62, R70, R72, R74, R76, R80, R96, R136, R138, R142 R144, R125, R130, R131
166.5K: R36
250K: R40, R78 (variable), R84 (variable), R86 (variable), R140 (variable)
300K: R32, R34
510K: R94
1.5M: R28

Integrated Circuits 741 operational amplifiers: Z2, Z4, Z6, Z8, Z12, Z14, Z16
348 operational amplifiers: Z18, Z20, Z22
GE HII FI: Z24, Z40
RC 4200: Z42

Transistors

2N3417: Q1 and Q2

Diodes

D1
D2
D3
D4

Capacitors

1uF: C1 and C2
4.7uF: C3

Switches

SW1: SPST
SW2: SPST

An electric motor manufactured by Minarik Electric Company, Catalogue No. 504-06-030, was selected to be used as torque device 40. The motor was controlled by a controller device 52 manufactured by Dart Controls Inc., Model No. 510-25RC-3, which was set to operate the motor at full speed with current limited by the inputs coupled to the outputs of opto-isolator Z40. Therefore, the motor speed follows the varying film take-up speed on load 200, and the torque contributed by the motor is controlled by controller 52.

The braking device 42 is a Model B20V51 magnetic particle brake manufactured by the Magnetic Power Systems Division of W. J. Industries, Inc. This brake was selected for its ability to operate smoothly at low speeds. The tachometers 48 and 50 are DC tachometers, Model No. 1150-16-0 manufactured by Beckman. The constant reducer gearbox 41 is a 5:1 reducer manufactured by Boston Gear under Catalogue No. FSP5A.

Figure 6:
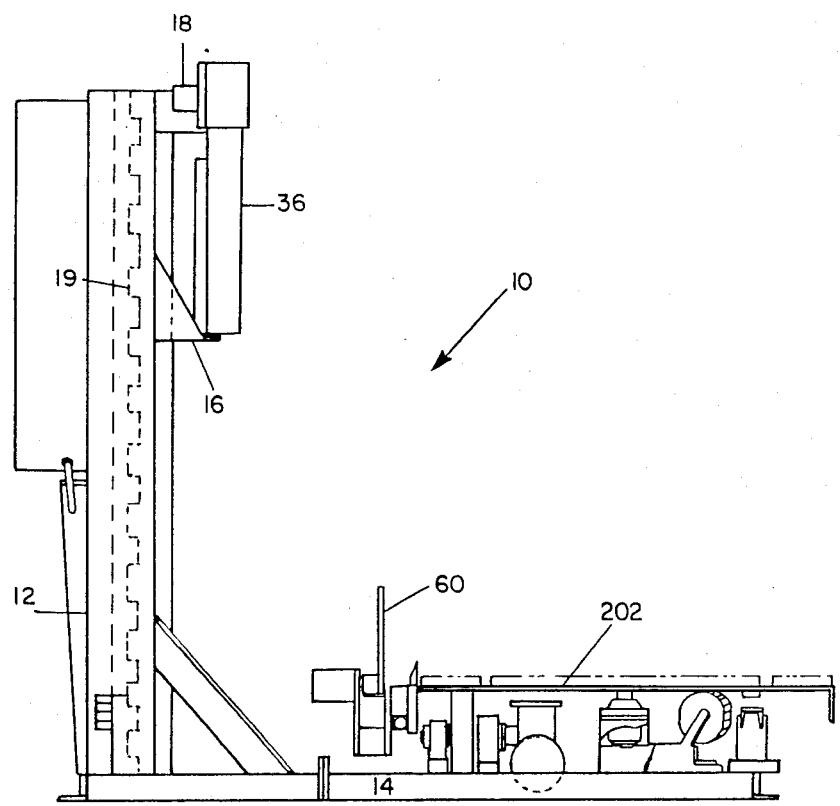
FIG. 6 is a side elevational view of the preferred embodiment of the present inventive apparatus.
Figure 11:
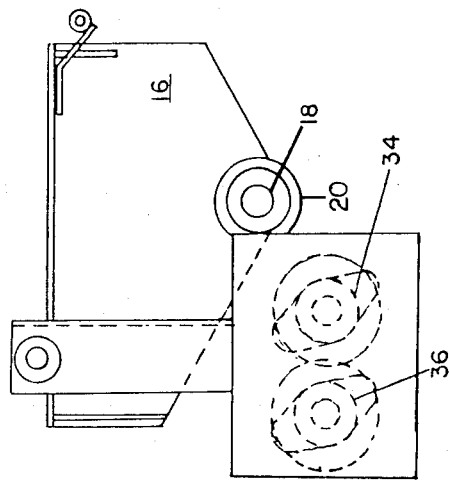
FIG. 11 is a top plan view of the film stretching assembly shown in FIG. 9.
Figure 8:
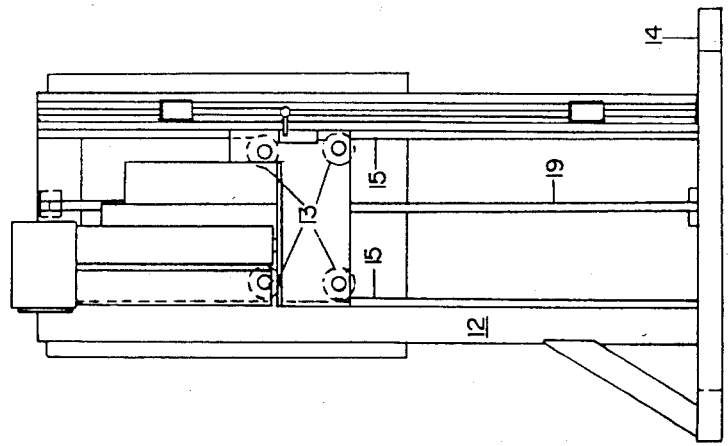
FIG. 8 is an isolated front elevational view with turntable removed of the apparatus of FIG. 6.
Figure 10:
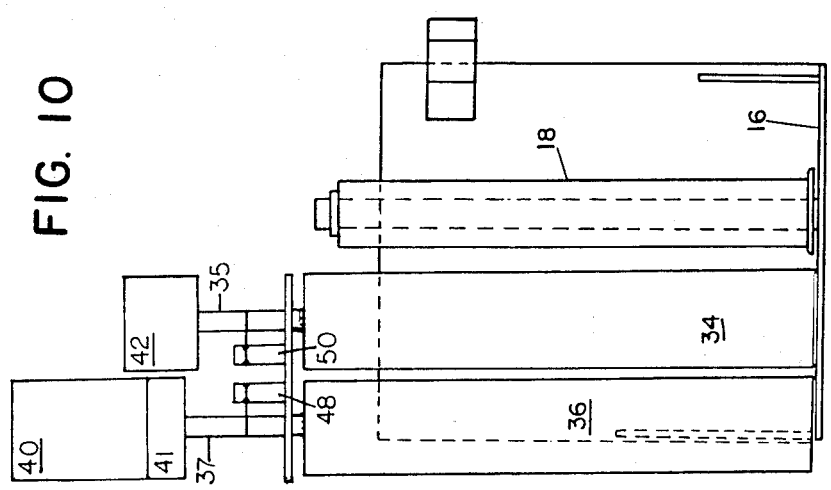
FIG. 10 is a front elevational view of the film stretching assembly shown in FIG. 9.
Figure 9:
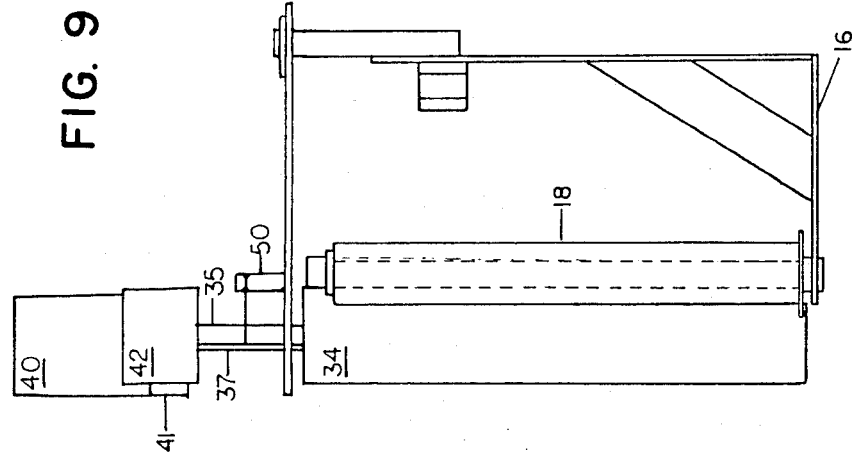
FIG. 9 is an enlarged isolated side elevational view of the film stretching assembly of the invention.

In operation of the preferred embodiment, the film web 22 is pulled from the film roll 20, threaded around the two rollers 34 and 36 which are configured for optimum film surface friction to avoid slippage and then secured to the load 200 by attachment to a clamp 60 mounted to the turntable as shown in FIG. 6, or by tucking the leading end of the film web into the load. When switches SW1 and SW2 are closed, no power is applied to brake 42 and minimal power is applied to torque device 40, and rollers 34 and 36 rotate freely, allowing easy threading and initial advancement of film web 22. If desired, the turntable revolution can begin with the torque device 40 and brake 42 disengaged. After passage of at least one corner of the load, torque device 40 and brake 42 are engaged by opening switches SW1 and SW2 to operate the rollers at the predetermined speed ratio. Typical ratios which have been used with the following films are: Mobil-X 250 percent; EVA 150 percent; and LDPE 70 percent. As the turntable 202 rotates, the film web 22 is pulled across the downstream roller 36 thereby precisely decreasing the speed for the upstream roller 34 in a predetermined ratio controlled by the first feedback means 44.

Second feedback means 46 is set to the desired load force, namely a force which does not crush the load or distort it during the wrapping operation up to the balance point. Typically, this force is less than 30 lbs. First feedback means 44 is adjusted to the desired elongation ratio, which can range up to four hundred percent in commercial usage. A spiral or full-web wrap cycle is accomplished on the load in a manner known in the art. Approximately one quarter turn before completion of the last turntable revolution, torque device 40 and brake 42 can be gradually disengaged by closing switches SW2 and SW1 to allow unwinding of selectively less stretched film which regains film tackiness allowing it to be wiped on a wrap. Cutting and sealing is performed in a standard known manner. Many films do not lose tackiness when stretched past the yield point and can be wiped onto the load at full stretch.

One positive aspect of the inventive wrap is that the very rapid elongation of the film followed by rapid strain relief of certain films will cause a "memorization" effect. Generally, films stretched above the yield point with the force to the load reduced at least fifty percent from the force achieved within the stretching mechanism and wrapped on the load at more than 100 linear feet per minute with a dwell time between the stretching assembly and the load of less than one half second achieve significant memory. Due to this memory effect, the film will significantly increase holding force and conformation to the load. PVC films, such as PS-26 by Borden Resinite Division, demonstrate this memory capacity very significantly. As an example, a 20 inch web of Mobil-X pre-stretched at 250 percent and wrapped on the load at thirteen pounds of force shows an increase in force over three minutes. This is the reverse of stress relaxation of over 20 percent in the first three minutes when stretched conventionally. Because of the film's memory, the film will actually continue to shrink for some time after being subjected to the high levels of stretch above the yield point and immediate reduction of force. This film characteristic can be used to wrap loads at very close to zero load wrapping force using the memory to build holding force and load conformity. Holding force increases in excess of 20 percent, 50 percent or even 100 percent over $F_2$ are possible.

The torque device was selected because of its very low inertial mass, low weight and responsiveness to speed change without torque change. Optimum wrapping results and machine reliability were obtained while keeping the film elongation on the pallet less than the elongation incurred between the rollers. At elongations significantly above elongations achieved between the rollers, secondary stretch occurs between the stretching device and the load. This secondary stretch induces significant forces in the film which cause premature zippering of the film on any load irregularity. Furthermore, this secondary stretch increases neck down of the film.

Figure 31:
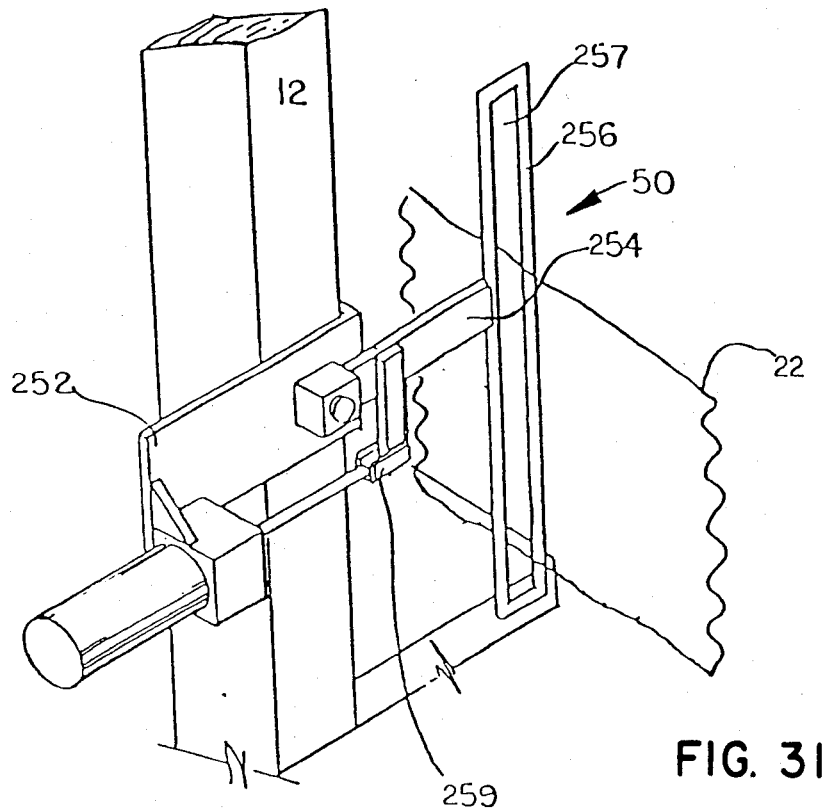
FIG. 31 is a partial perspective view of the roping mechanism of the apparatus when the web is in a full width open position.
Figure 32:
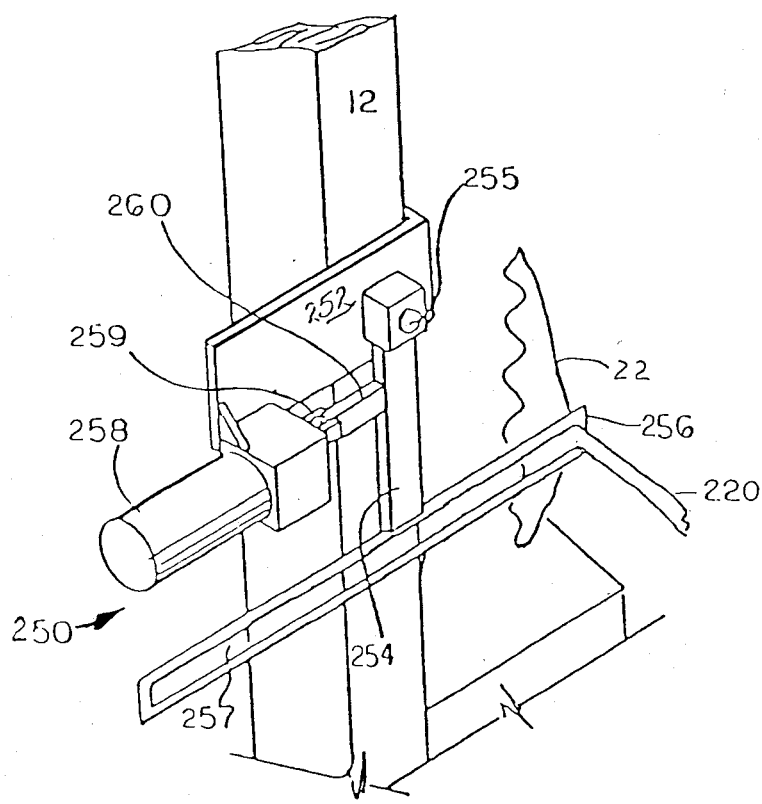
FIG. 32 is a partial perspective view of the roping mechanism when the mechanism is rotated to collapse the web into a rope.

When film loses its tackiness after being stretched beyond the yield point or in other wrapping circumstances, it may be desired to rope and/or tie the film web to complete the package wrap. Mobil-X is one film which currently loses tackiness when stretched past its yield point. In such circumstances the unit load is either spiral or full-web wrapped in a conventional manner. Preferably, the film web is roped upstream of the roller system as is shown in FIGS. 31 and 32. However, for certain applications the film can be roped downstream of the roller system. The roper mechanism 250 comprises a support plate 252 secured to frame 12, and a rotatable support bar 254 having one end rotatably mounted to the support plate, the other end being secured to the web reduction member 256. The web reduction member 256 comprises a rectangular shaped bar which defines a rectangular aperture 257. The length of the rectangular aperture is greater than the width of the web of material used for wrapping the load and the thickness of the rectangular aperture is greater than the thickness of the web. Preferably, it is also equal to the desired thickness of the web when the edges are roped so that when member 256 is rotated, web material 22 is roped into a width substantially equal to the width of aperture 257 as shown in FIG. 32.

A pneumatically activated cylinder 258 is secured to the support plate 252 or the frame and has an end 259 of its piston rod rotatably connected to drive bar 260 which is in turn secured to the rotatable support bar 254. Cylinders 258 can be energized by known fluid circuitry to move the rotatable support bar so that it rotates around the pivot point carrying the web reduction member 256 upward or downward in an approximate 90 degree arc. This causes the web material to be formed into a roped configuration 500 when the rectangular member is parallel to the ground or alternately allows free flow of the open web through the web reduction member 256 when the web reduction member is positioned substantially perpendicular to ground.

The material web when roped passes through a clamping assembly 170 mounted to the edge of the turntable. It should be noted that turntable clamp 60 is not present when web roping is used.

The clamp assembly 170 comprises a stationary arm mechanism 172 and a rotatable clamp mechanism 174 mounted to a shaft 176 which is rotated by a rotary pneumatic cylinder 178.

The stationary arm mechanism 172 comprises a support block 180 mounted to turntable 207, a seat support 182 secured to the support block 180 and a cylinder support subassembly 184 secured to the support block. The support block has its rear portion 185 secured to the pneumatic cylinder and its forward portion 186 secured to the stationary seat support 182. The seat support 182 has a U-shaped seat 188 with a resilient friction member 190 made of rubber or other suitable resilient material secured in the seat and extending above the legs 200 and 208 of the U-shaped seat 182 for engagement with clamp arm 198 of the rotary clamp mechanism 174. The rotary clamp mechanism 174 comprises a material guide member 192 of an eccentric shape having a circular aperture 194 of suitable diameter surrounding the pneumatic cylinder 178 so that the guide member 192 can freely rotate around the pneumatic cylinder. A curved surface notch 196 is cut inward from the exterior edge of the material guide member 192 a suitable distance which allows the notch to receive and guide the roped material during the tying and severing operation of the apparatus.

The clamp arm 198 is secured to the spacer bar 210 which is secured in turn to the guide member 192. The clamp arm 198 has a cut-away segment 202 which approximates a curved L-shaped surface forming the contact surface for engagement with the resilient member 190. The segment 202 has a planar surface 204 adapted to engage the resilient friction member 190 to hold the roped material therebetween. The outwardly extending leg 206 of the L is adapted to be positioned adjacent the leg 208 of the seat 188 to engage the stretched material at the smallest angle of extension from the wrapped package.

A cutting mechanism 220 and tying mechanism 240 are secured to a moveable arm 212 which sequentially moves the mechanism into the path of the material for the severing and tying steps. The arm 212 is rotatably mounted on support structure 214 and is driven by pneumatic cylinder 216 secured to the frame 222. Extension of the piston arm 217 of cylinder 216 drives the arm and the associated cutting and tying mechanism into the material path so that the mechanism can perform its desired function. Secured to the traversing arm 212 are a perpendicularly extending arm 218 which holds the tying mechanism 240 and a support structure 219 which is mounted to the top of the arm and supports the cutting mechanism 220. The cutting mechanism 220 comprises an upright support plate 222 and traverse brace 224 secured to the support plate and a piston 226 which is secured to the upright support plate 222. A piston arm 227 extends from the piston, the distal end of which is secured to a cutting blade 228. The cutting blade 228 is reciprocally positioned in a guillotine sheath or housing 230, which is secured to the end of the arm 212. The guillotine sheath 230 comprises a plate structure having an inwardly inclined notch 233 cut into one side adapted to receive the roped material and direct it into a center of the notch 234. The trailing end of the roped material is held and carried in cutting notch 234 to a point where it is positioned beside the leading roped end of the wrap held in guide member notch 196 so that both the leading and trailing roped sections of the wrap are severed by reciprocating action of the cutting blade 228.

A standard hog ringer device 242 such as that made by ATRO Company, Types I and C, is secured to the lower part of arm 219. A magazine 244 extends perpendicularly from the mechanism to feed staples or hog rings into the mechanism. In operation of this standard hog ringer, the shaped nose 246 of the hog ringer engages the leading and trailing ends of the roped material to be tied together and a ring or staple is driven around the roped material held in the nose of the ring and closed by bending the ring or staple around the roped sections to be tied. Thus, the two roped web layers which have been placed side by side are fastened together through the action of the hog ring passing a staple around both of the ropes and tying them together through the contraction or bending of the staple or ring around the materials.

It can be seen that the process and apparatus for elongating plastic film to overwrap products for containment using a feedback controlled pre-stretch mechanism provides a significant improvement over the prior art. The pulling action elongates the film between the two rollers rotating at different speeds and isolates the elongation action from the film roll and the pallet load. The forces on the film result in some strain recovery because the yield point is exceeded and a significant reduction in film relaxation after stretch is obtained. It should be noted at this point that the yield point is substantially defined by the tensile yield of the stretch film being used. The tensile yield under ASTM Test Method D-882 for Mobil-X film is 980 psi; Mobil-H film, 1000 psi; and Mobil-C film, 1000 psi. The force $F_y$ required to reach the yield point prior to stretching for a given film web is found by the formula $F_y$ = cross sectional area x tensile yield As an example, the yield point of a 20"×0.0009 inch web of Mobil-X-film would therefore by 17.6 pounds before it is pre-stretched.

The common tests used to determine tensile yield are the ASTM D-882 and ASTM D-638.

The lower forces placed on the load allow the overwrapping of the product at very high levels of elongation without disruption or crushing forces which would be incurred at equivalent levels of elongation using conventional brake-type film stretch systems.

Figure 22:
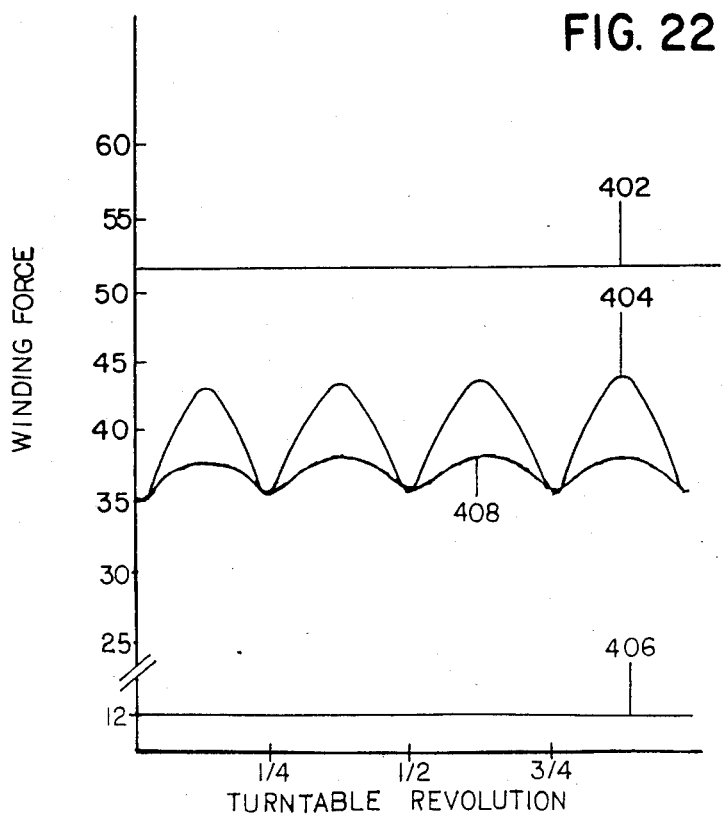
FIG. 22 is a graph of winding force versus angular turntable rotation for the present invention and other embodiments.
Figure 23:
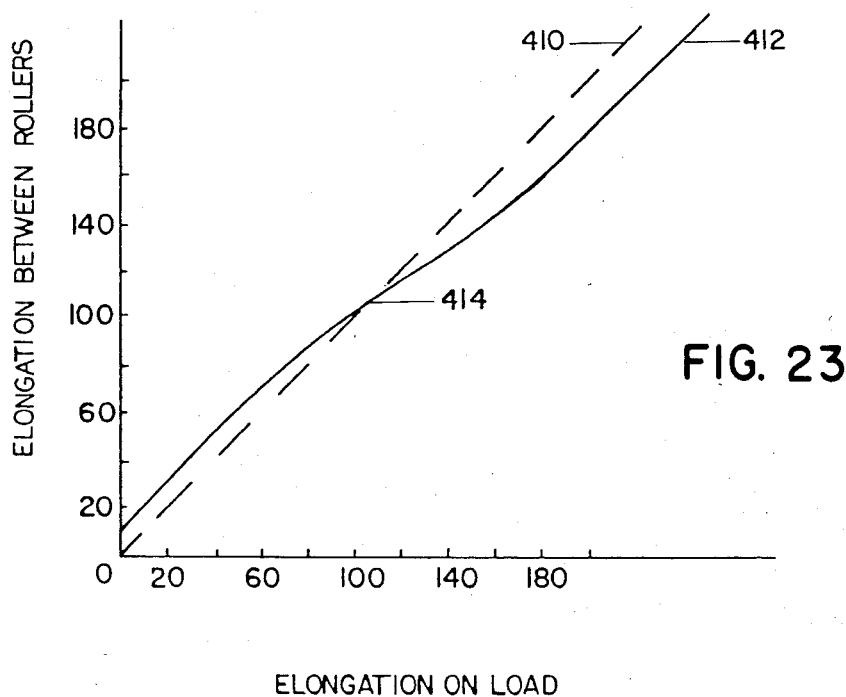
FIG. 23 is a graph of the balance point of elongation between rollers and elongation in the ROLLER STRETCH embodiment.
Figure 25:
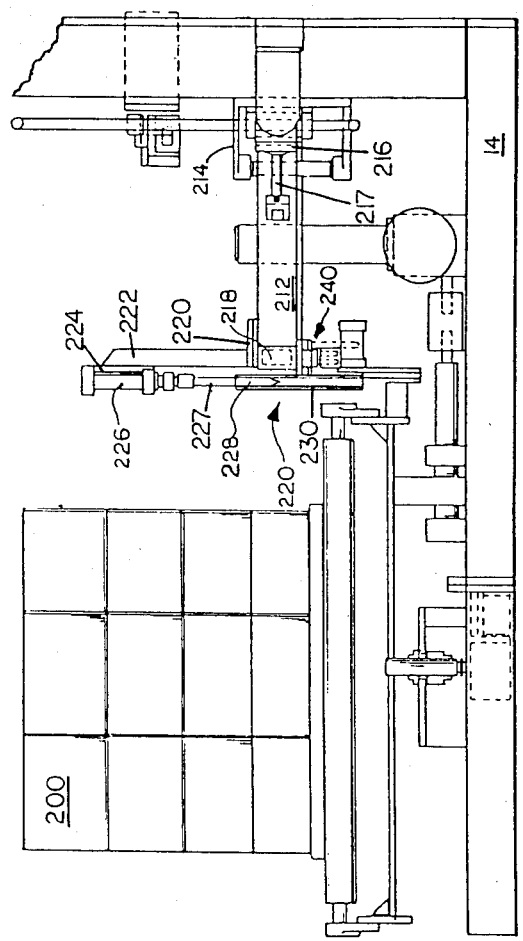
FIG. 25 is a partial side elevational view of a roping and tying assembly used with the invention.
Figure 26:
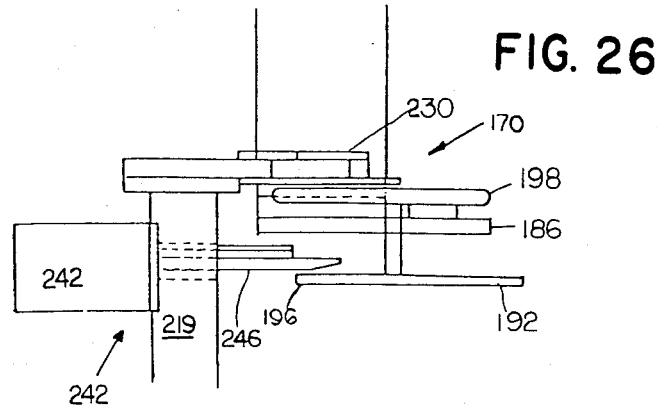
FIG. 26 is an enlarged partial top plan view partially in section of the clamping assembly and tying assembly of FIG. 25.
Figure 27:
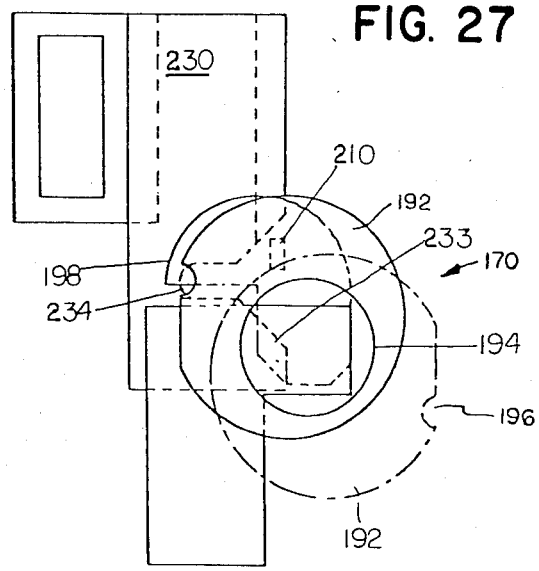
FIG. 27 is a side elevational view of the clamping assembly shown in FIG. 26 showing the position of the clamping assembly when rotated in phantom.
Figure 28:
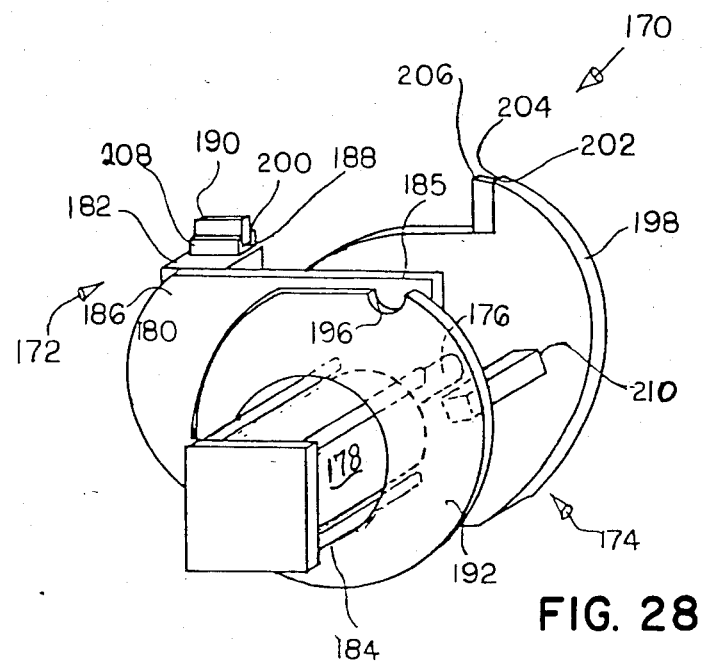
FIG. 28 is an enlarged isolated perspective view of the clamping assembly of the roping mechanism in an open position.
Figure 30:
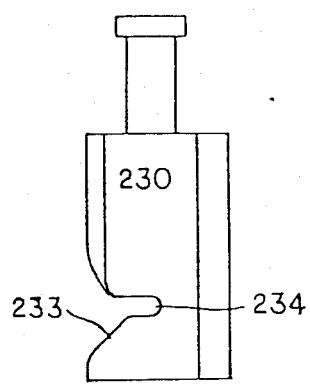
FIG. 30 is a side elevational view of the cutter mechanism housing.
Figure 29:
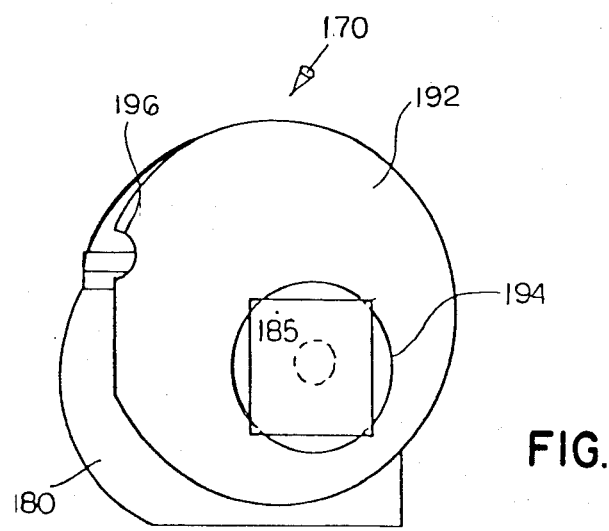
FIG. 29 is a side elevational view of the clamping assembly of FIG. 27.

FIG. 22 is a graphic depiction of the performance advantage obtained by using the present invention. FIG. 23 depicts the balance point obtained with ROLLER STRETCH which is helpful in understanding the invention. The film used in obtaining the data for the graphs was Mobil-X.

FIG. 22 also illustrates the winding force exerted on film pulled by a rectangular load on a rotating turntable as a function of the angular position of the turntable. Curve 402 shows this function for the direct film web drive called ROLLER STRETCH, curve 404 shows the function for the power stretch embodiment, curve 408 shows the function for the power assisted embodiment, and curve 406 shows the function at a typical $F_2$ setting for the present invention. It is clear that the present invention combines and enhances the advantage of minimal variance in winding force as seen in the film drive embodiment with the advantage of lower absolute winding force as seen in the power stretch embodiment.

FIG. 23 illustrates the percentage of elongation between rollers as a function of the percentage of elongation of film applied to the palletized load in the ROLLER STRETCH embodiment. Line 410 is a 45 degree line, that is, one in which the elongation on the Y axis of the graph is precisely equal to the elongation on the X-axis of the graph. Curve 412 shows the actual performance of the film web drive embodiment. Point 414 shows the balance point between the two.

Commercial pallet loads differ significantly from straight "Instron Type" devices which are utilized by film companies in order to determine the laboratory stretch characteristics of their film. Real film wrapping applications are commercially applied to three different load configurations which are designated for convenience, into load profiles A, B, and C. The A load profile is a substantially smooth surfaced load which has no puncture hazards and fits on or overhangs the pallet. The test profile of the A load is a 36 inch×36 inch frame with a nominal 2 by 4 inch border extension on one corner of one inch. The B load profile is an irregular shaped load with a puncture hazard up to three inches. The test profile of the B load is a 36 inch×36 inch frame with a nominal 2 to 4 inch border extension on opposite corners of 2 to 3 inches. The C load profile is a random shaped load with a puncture hazard of over three inches. The test profile of the C load is a 36 inch×36 inch frame with nominal 2 by 4 inch border extension on opposite corners of 4 inches and 5 inches.

Figure 24:
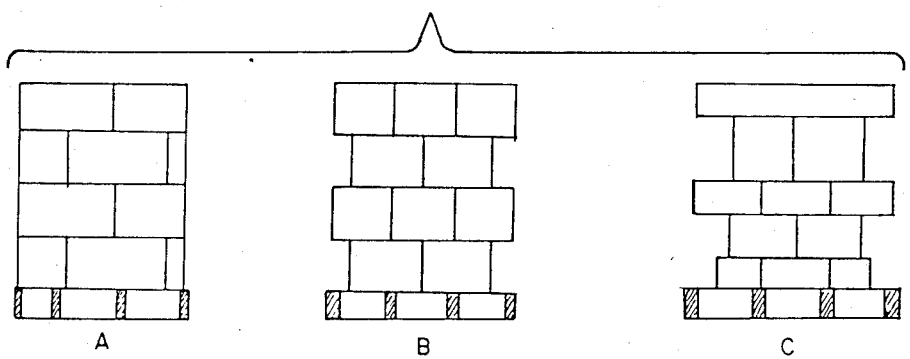
FIG. 24 is a front elevational view of a composite of three loads types A, B, and C.
Figure 1:
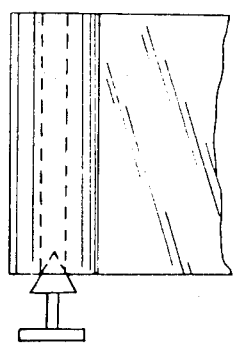
FIG. 1 is a side elevational view of a prior art core braking mechanism engaged with a film supply roll.
Figure 2:
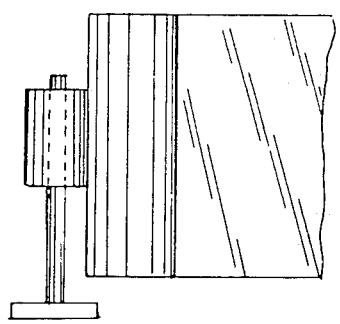
FIG. 2 is side elevational view of prior art roller braking mechanism engaged with a film supply roll.
Figure 14:
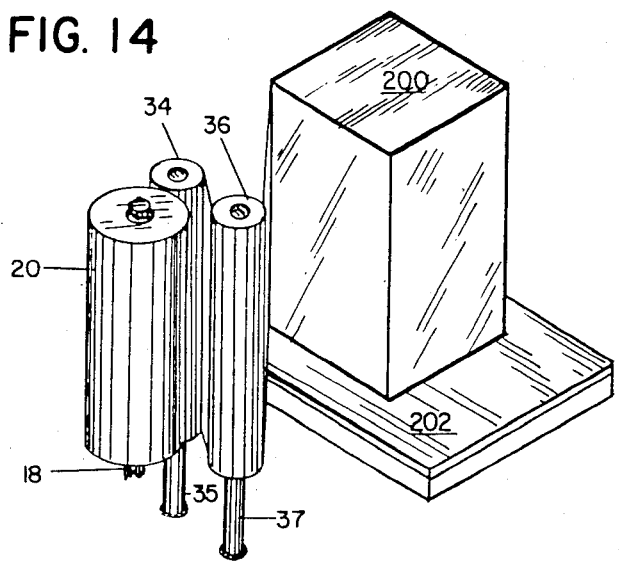
FIG. 14 is an elevated perspective view of the apparatus in FIG. 13.
Figure 4:
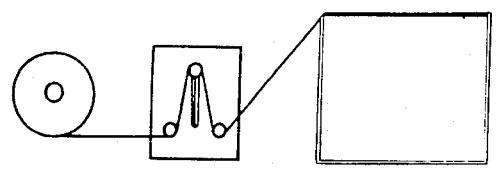
FIG. 4 is an isolated top plan view of friction bar prior art stretch wrapping apparatus.
Figure 5:
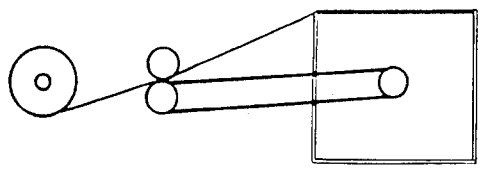
FIG. 5 is an isolated top plan view of a turntable driven nip roller prior art stretch wrapping apparatus.
Figure 3:
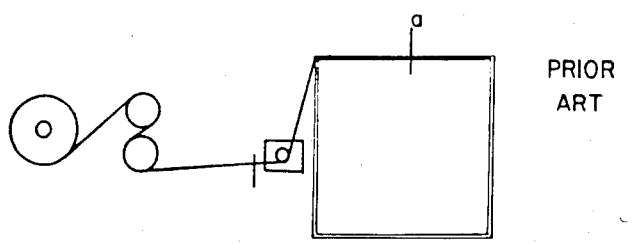
FIG. 3 is an isolated top plan view of an "S" configuration prior art stretch wrapping apparatus.
Figure 7:
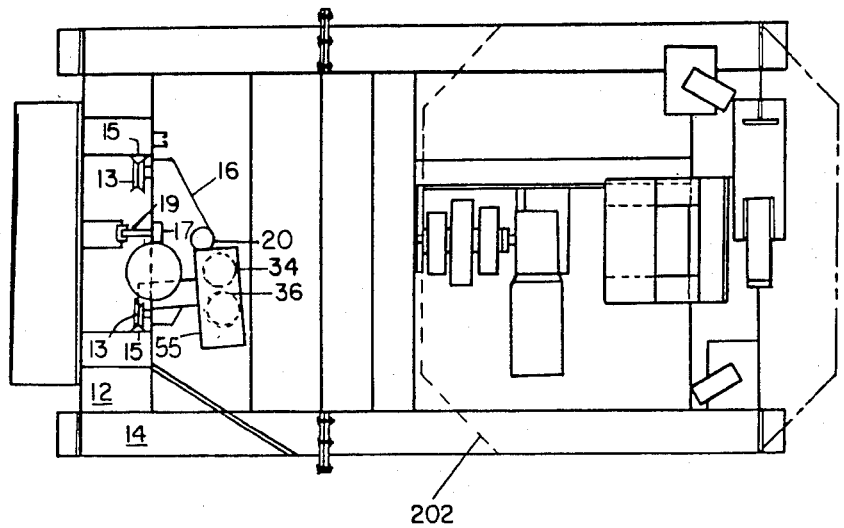
FIG. 7 is a top plan view of the apparatus shown in FIG. 6.

Because of the tear characteristics of the film, it can be seen that different types can be applied to different load profiles at various percentages of stretch. A measure of how much a given film may be stretched over a given load is determined by the film's elasticity, tear resistance, puncture resistance and consistency. In this regard, it should be generally noted that the type A load profile can utilize films of the highest percentage of stretch with the B profile allowing an intermediate amount of stretch and the C type profile having the lowest amount of stretch which can be placed on the load. An example of the three load profiles is shown in FIG. 24. For the purposes of this application, stretch wrapping films have also been characterized into different categories. These catagories have been broken down into type 1 films such as linear low density polyethylene; type 2 films such as ethylvinylacetate; polyvinylchloride and cast low density polyethylene, and type 3 films such as blown low density polyethylene. Commercial examples of type 1 films are Bemis ST-80, Mobil-X, and Presto SG-4; type 2 films are Consolidated Thermoplastics RS-50, Borden Resinite PS-26, and Mobil-C. Generally speaking, the type 1 films have a higher degree of stretch over all three load profiles with the type 2 films having intermediate stretch over all load profiles, and the type 3 films having the lowest stretch over all load profiles.

It should be noted that the steps of the wrapping process can be interchangeable without departing from the scope of the invention. Furthermore, these steps can be interchanged and are equivalent.

In the foregoing description, the invention has been described with reference to a particular preferred embodiment, although it is to be understood that the specific details shown are merely illustrative and the invention may be carried out in other ways without departing from the true spirit and scope of the appended claims.

What is claimed is:

1. A process of making a unitary package by wrapping a plurality of units with a stretched plastic material overwrap forming a unitary load comprising the steps of:
    a. creating a relative movement between a supply of the plastic material and the load to dispense a web of stretchable plastic material from a roll across an upstream roller and a downstream roller to a rotating load;
    b. applying a restriction force to the upstream roller to stretch the plastic material as it is being dispensed from the supply;
    c. sensing speeds of said rollers, calculating the actual eleongation of the material between said rollers and determining and adjusting the restriction force to the upstream roller to adjust the speed of the upstream roller thereby stretching said plastic material substantially above its yield point and maintaining the elongation of said material at an infinitely variable predetermined constant elongation level $E_D$ thereby gaining substantially in strength per cross-sectional area;
    d. applying a power assistance force to the downstream roller to reduce the stretch force $F_2$ on the load;
    e. sensing the adjusted restriction force and the applied assistance force, determining the actual force on the load, and determining and adjusting said assistance force to said downstream roller to maintain force to the load, which is equal to the difference between the adjusted restriction force and the adjusted assistance force, at a predetermined and substantially constant level and causing inelastic strain recovery before the plastic material is wrapped around the load;
    f. adjusting said restriction force and said variable positive torque as said material is dispensed in order to maintain $E_D$ and $F_2$ constant;
    g. wrapping the load with said prestretched plastic material which has been force relieved while maintaining the majority of its elongation; and
    h. severing said plastic material between said load and said supply.

2. A process as claimed in claim 1 wherein the plastic material has maintained at least eighty percent of its elongation.

3. A process as claimed in claim 1 wherein said plastic material streched over its yield point increases the force that is holding the load after severance at least 20 percent over $F_2$.

4. A process as claimed in claim 1 wherein said plastic material stretched over its yield point increases the force that is holding the load after severance at least 50 percent over $F_2$.

5. A process as claimed in claim 1 wherein said plastic material stretched over its yield point increases the force that is holding the load after severance at least 100 percent over $F_2$.

6. A process as claimed in claim 1 wherein said rollers are spaced apart in a range of ¼ inch to 2 inches.

7. A process as claimed in claim 1 wherein said plastic material is a low density polyethylene which has been stretched at least 300 percent.

8. A prodess as claimed in claim 1 wherein said plastic material is an polyvinylchloride.

9. A process as claimed in claim 1 wherein said plastic material is an ethylvinylacetate.

10. A process of making a unitary package by wrapping a plurality of units with a stretched plastic film web overwrap to form a unitary packaged load comprising the steps of:
    a. placing a load on a support;
    b. positioning a roll of stretchable plastic film web on a dispenser means adjacent to said support;
    c. withdrawing a leading edge of said plastic film web from said dispenser means through a plastic film web pre-stretching means comprising at least upstream and downstream rollers;
    d. holding said plastic film web adjacent said load;
    e. creating a relative movement between the dispenser means and the load so that said web is pulled across said rollers;
    f. stretching said film web above its yield point in said pre-stretching means by rotating the load causing the film web to be pulled across the downstream roller surface propelling the film web at a faster rate of speed $V_2$ than the upstream roller surface speed $V_1$ by applying a restraint force $F_1$ to the upstream roller causing the film web to incur elongation $E_D$ between said roller surfaces;
    g. applying a variable positive force $F_T$ to the downstream roller to reduce the stretch force $F_2$ to the load to a constant level below the force required to prestretch the film web;
    h. sensing $V_1$ and $V_2$, calculating actual elongation between said roller surfaces, and calculating and adjusting the restraint force $F_1$ to said upstream roller to adjust $V_1$ so that $E_D$ remains predetermined and substantially constant;
    i. sensing the adjusted $F_1$ and applied $F_T$, calculating actual force $F_2$ to the load, and calculating and adjusting $F_T$ so that said adjusted restraint force $F_1$ less said adjusted positive force $F_T$, which is equal to the actual wrapping force $F_2$, remains predetermined and substantially constant; and
    j. wrapping the load with more than one revolution of the previously elongated film web.

11. A process as claimed in claim 10 wherein said wrapping is a spiral wrap.

12. A process as claimed in claim 10 wherein said wrapping is a full web wrap.

13. A process as claimed in claim 10 wherein said wrapping is a roped material.

14. A process as claimed in claim 10 wherein said wrapping is a tacky material.

15. A process for spirally wrapping a web of stretchable plastic material around a pallet holding a plurality of units to form a unitary packaged load comprising;
    a. placing a roll of stretchable plastic material on a dispenser;
    b. withdrawing the leading end of said web of stretchable material from said roll through variable elongation means comprising at least two rollers which extend across the web of the stretchable material;
    c. holding the leading edge of said web of stretchable material adjacent a load comprising a plurality of units;
    d. pulling said web of stretchable material through the elongation means by rotating said load when the elongation means is in a minimal elongation state and at least partially wrapping th load;

e. adjusting the elongation means to an increased elongation state;

f. stretching said web between said at least two rollers by sensing the speed $V_2$ of said web past a downstream roller and the speed $V_1$ of said web past an upstream roller as a braking force $F_1$ is applied to the upstream roller, calculating the elongation of said web between said at least two rollers, and calculating and adjusting the braking force $F_1$ to said upstream roller to adjust $V_1$ and to stretch said web past its yield point at a predetermined constant rate $E_D$;

g. applying a positive force $F_T$ to said downstream roller of the elongation means with a positive torque device, sensing the adjusted $F_1$ and applied $F_T$, calculating actual force applied to the web between the elongation device and the load, and varying $F_T$ allowing inelastic strain recovery to take place between the elongation means and the pallet by reducing the force required to carry elongated web between the elongation device and the load, which is equal to the difference between the varied braking force $F_I$ and the varied positive force $F_T$, to a predetermined constant level $F_2$;

h. continually displaying data representing $E_D$ and $F_2$; and i. wrapping the elongated web which has incurred inelastic strain recovery around the load.

16. The process as claimed in claim 15 wherein the elongation means is unconnected through at least ¼ revolution of the load to place a portion of material on said load that is stretched less than its yield point.

17. The process as claimed in claim 15 wherein the elongation means is unconnected through at least ¼ revolution of the load to place a portion of material on said load that is substantially unstretched.

18. A process of making a unitary package as claimed in claim 15 wherein step i further comprises wrapping the load with elongated web whose dwell time between the elongation means and the load is less than one half second and which travels at a speed of at least 100 linear feet per minute.

* * * * *